United States Patent
Park et al.

(10) Patent No.: US 11,367,299 B1
(45) Date of Patent: Jun. 21, 2022

(54) FINGERPRINT GENERATOR CAPABLE OF APPLYING CONSTANT FORCE AND FINGERPRINT GENERATION METHOD USING THE SAME

(71) Applicant: REPUBLIC OF KOREA (NATIONAL FORENSIC SERVICE DIRECTOR MINISTRY OF THE INTERIOR AND SAFETY), Wonju-si (KR)

(72) Inventors: Nam Kyu Park, Bucheon-si (KR); Byung Seon Moon, Busan (KR); Jae Mo Goh, Wonju-si (KR); Jin Pyo Kim, Daejeon (KR); Young Il Seo, Wonju-si (KR); Eun Ah Joo, Yongin-si (KR); Je Hyun Lee, Wonju-si (KR); Sang Yoon Lee, Wonju-si (KR)

(73) Assignee: REPUBLIC OF KOREA (NATIONAL FORENSIC SERVICE DIRECTOR MINISTRY OF THE INTERIOR AND SAFETY), Wonju-si (KR)

( * ) Notice: Subject to any disclaimer, the term of this patent is extended or adjusted under 35 U.S.C. 154(b) by 0 days.

(21) Appl. No.: 17/360,901

(22) Filed: Jun. 28, 2021

(30) Foreign Application Priority Data

May 4, 2021 (KR) .......................... 10-2021-0057873

(51) Int. Cl.
*G06V 40/13* (2022.01)

(52) U.S. Cl.
CPC ...................................... *G06V 40/13* (2022.01)

(58) Field of Classification Search
None
See application file for complete search history.

(56) References Cited

U.S. PATENT DOCUMENTS

2020/0193115 A1* 6/2020 Schultz .................. G06F 21/32

* cited by examiner

*Primary Examiner* — Nicholas J Lee
(74) *Attorney, Agent, or Firm* — Hauptman Ham, LLP

(57) ABSTRACT

A fingerprint generator capable of applying a constant force includes: a base plate in which a target surface may be on an upper surface of the base plate; a fingerprint mounting unit that is apart from the upper surface of the base plate and capable of mounting a fingerprint molding body having a fingerprint shape thereon on a lower portion of the fingerprint mounting unit; a driving unit that is apart from the upper surface of the base plate and capable of moving the fingerprint mounting unit up and down; and a force measuring unit configured to measure an impact force when the fingerprint mounting unit descends and contacts the fingerprint shape with the target surface to generate a fingerprint on the target surface.

10 Claims, 7 Drawing Sheets

FINGERPRINT GENERATOR CAPABLE OF APPLYING CONSTANT FORCE AND FINGERPRINT GENERATION METHOD USING THE SAME

CROSS-REFERENCE TO RELATED APPLICATION

This application claims the benefit of Korean Patent Application No. 10-2021-0057873, filed on May 4, 2021, in the Korean Intellectual Property Office, the disclosure of which is incorporated herein in its entirety by reference.

BACKGROUND

1. Field

One or more embodiments relate to a fingerprint generator capable of applying a constant force and a fingerprint generation method using the same.

2. Description of the Related Art

Fingerprint evidence found at the crime scene is important evidence that may identify a suspect.

A latent fingerprint refers to a fingerprint shape that remains as evidence by natural secretions from human skin, but cannot be seen with the naked eye. Most fingerprints generated at crime scenes exist in the form of latent fingerprints. Therefore, the technique of developing these latent fingerprints to the naked eye is very important.

As described above, the technique of developing latent fingerprints to make latent fingerprints visible to the naked eye varies depending on a target surface to be developed and the environment. The technique of developing latent fingerprints has the existing optimal technique depending on the situation, but it is continuously developing. In order to research and develop the technique of developing latent fingerprints that continuously improves, it is necessary to generate a uniform fingerprint for an experiment.

In an experiment to evaluate a fingerprint reagent or method for the development of the technique of developing latent fingerprints, a method of generating a fingerprint by directly touching a human finger with a target surface is used. During such an experiment, the conditions for generating fingerprints are uneven, which impairs the reliability of the experiment.

SUMMARY

One or more embodiments include a fingerprint generator capable of applying a constant force and a fingerprint generation method using the same. In more detail, one or more embodiments include a device and a method of generating a fingerprint by applying a constant force using a fingerprint molding body in which a human fingerprint is formed on silicon or gelatin.

One or more embodiments include a device and method of repeatedly generating fingerprints by applying a constant force or applying various levels of force for research and experimentation of the technique of developing latent fingerprints.

According to one or more embodiments, a fingerprint generator capable of applying a constant force includes: a base plate in which a target surface may be on an upper surface of the base plate; a fingerprint mounting unit that is apart from the upper surface of the base plate and capable of mounting a fingerprint molding body having a fingerprint shape thereon on a lower portion of the fingerprint mounting unit; a driving unit that is apart from the upper surface of the base plate and capable of moving the fingerprint mounting unit up and down; and a force measuring unit configured to measure an impact force when the fingerprint mounting unit descends and contacts the fingerprint shape with the target surface to generate a fingerprint on the target surface.

In an embodiment, the fingerprint generator capable of applying a constant force may further include an input unit configured to receive an input signal according to a user input; a control unit configured to operate the driving unit according to the user input to control the fingerprint mounting unit on which the fingerprint molding body is mounted to descend and generate a fingerprint on the target surface; and a display unit configured to display user input information capable of operating the driving unit with a constant force or operation information of the driving unit.

In an embodiment, the user input information may include the amount of force applied to the target surface or the number of times the driving unit is operated.

In an embodiment, the input unit, the control unit, and the display unit may be formed as a single control panel.

In an embodiment, the fingerprint generator capable of applying a constant force may further include a fixing unit capable of fixing the fingerprint mounting unit and the driving unit in a position apart from the upper surface of the base plate.

In an embodiment, the fingerprint molding body may have the fingerprint shape formed on the surface of silicon or gelatin.

According to one or more embodiments, a fingerprint generation method using a fingerprint generator capable of applying a constant force includes: mounting a fingerprint molding body having a fingerprint shape on a lower portion of a fingerprint mounting unit of the fingerprint generator including a base plate, the fingerprint mounting unit, a driving unit, and a force measuring unit; applying an experimental fingerprint solution to the fingerprint molding body; and generating a fingerprint on the target surface by lowering the fingerprint mounting unit to contact the fingerprint shape with a target surface located on an upper surface of the base plate.

In an embodiment, the fingerprint generator may further include an input unit, a control unit, and a display unit, and the fingerprint generation method using the fingerprint generator capable of applying a constant force may further include obtaining user input information capable of operating the driving unit with a constant force after the mounting of the fingerprint molding body.

In an embodiment, the obtaining of the user input information may include: measuring an impact force, by the force measuring unit, when a user inputs the descending speed of the driving unit and generates a fingerprint on the target surface; and determining the amount of force applied to the target surface or the number of times the driving unit is operated based on the measured impact force by the user.

In an embodiment, the generating of a fingerprint on the target surface may include generating a plurality of fingerprints by applying a constant force by a user to the target surface or generating a fingerprint while changing the amount of force applied to the target surface at certain intervals, based on the obtained user input information.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments will be described in detail with reference to the accompanying drawings. The same reference numerals are used to denote the same elements, and repeated descriptions thereof will be omitted.

It will be understood that although the terms "first," "second," etc. may be used herein to describe various components, these components should not be limited by these terms.

An expression used in the singular encompasses the expression of the plural, unless it has a clearly different meaning in the context.

It will be further understood that the terms "comprises" and/or "comprising" used herein specify the presence of stated features or components, but do not preclude the presence or addition of one or more other features or components.

It will be understood that when a layer, region, or component is referred to as being "formed on" another layer, region, or component, it can be directly or indirectly formed on the other layer, region, or component. That is, for example, intervening layers, regions, or components may be present.

Sizes of elements in the drawings may be exaggerated for convenience of explanation. In other words, since sizes and thicknesses of components in the drawings are arbitrarily illustrated for convenience of description, the following embodiments are not limited thereto. When a certain embodiment may be implemented differently, a specific process order may be performed differently from the described order. For example, two consecutively described processes may be performed substantially at the same time or performed in an order opposite to the described order.

It will be understood that when a layer, region, or component is connected to another portion, the layer, region, or component may be directly connected to the portion or an intervening layer, region, or component may exist. For example, when a layer, region, or component is electrically connected to another portion, the layer, region, or component may be directly electrically connected to the portion or may be indirectly electrically connected to the portion through another layer, region, or component.

In the specification, "fingerprint" refers to a pattern on the skin inside a human fingertip or a trace of it. The "fingerprint" includes ridges, which are raised lines at the entrance of sweat glands in the skin of a fingertip, and valleys, which are indentations between the ridges.

Hereinafter, a fingerprint generator capable of applying a constant force according to an embodiment will be described with reference to FIGS. 1 to 3.

Figure 1:
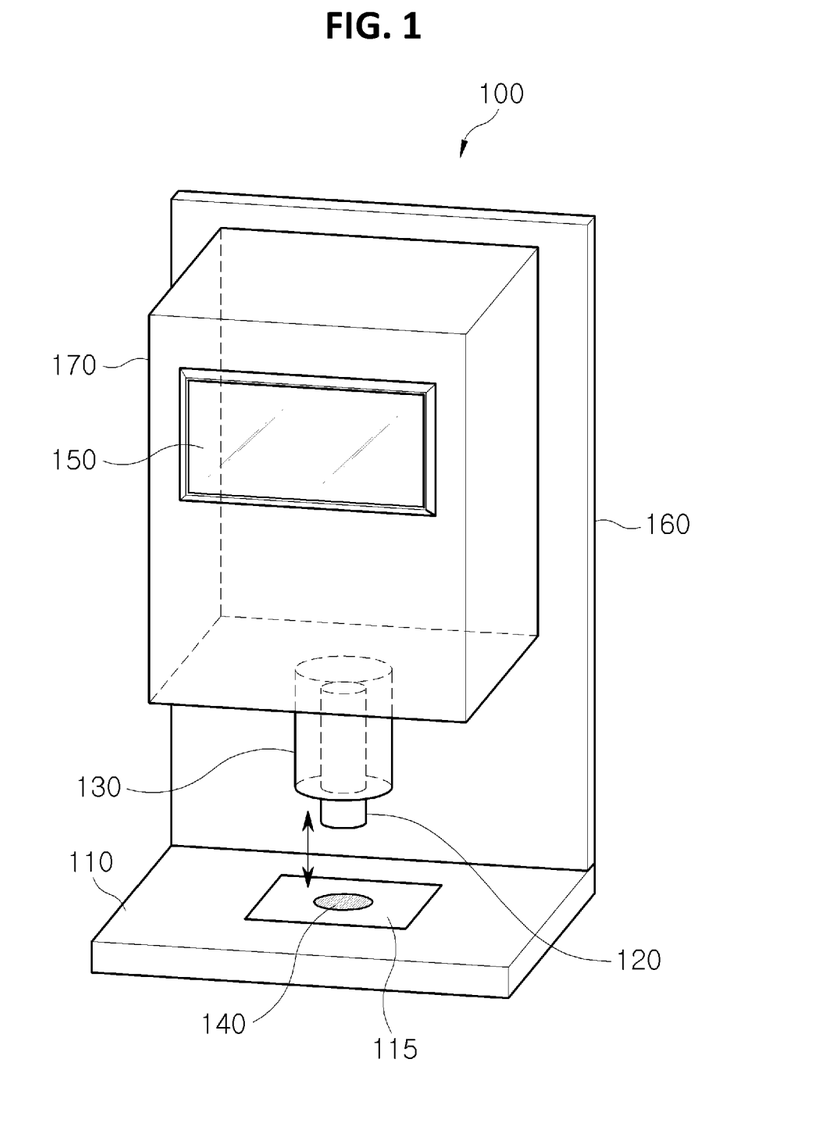
FIGS. 1 and 2 are exemplary views of a fingerprint generator capable of applying a constant force according to an embodiment.
Figure 2:
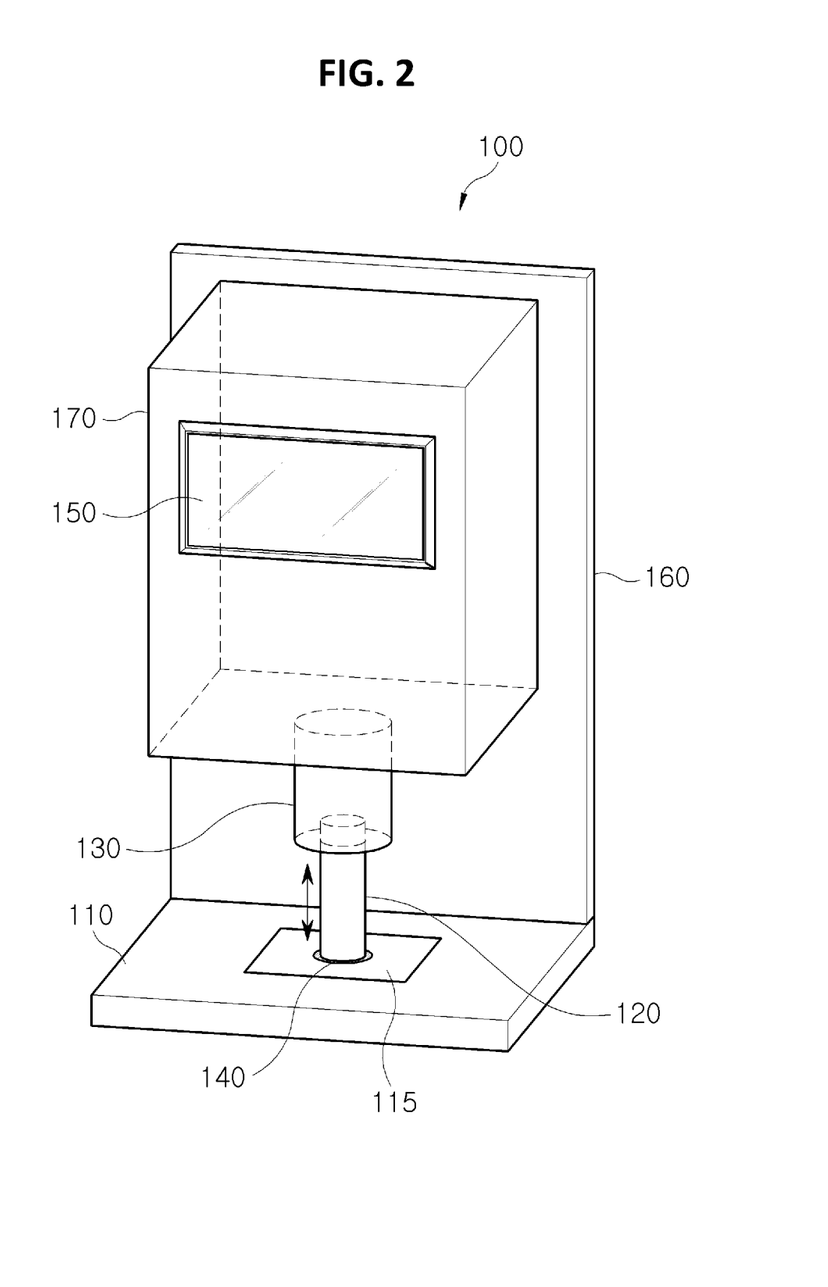
Figure 3:
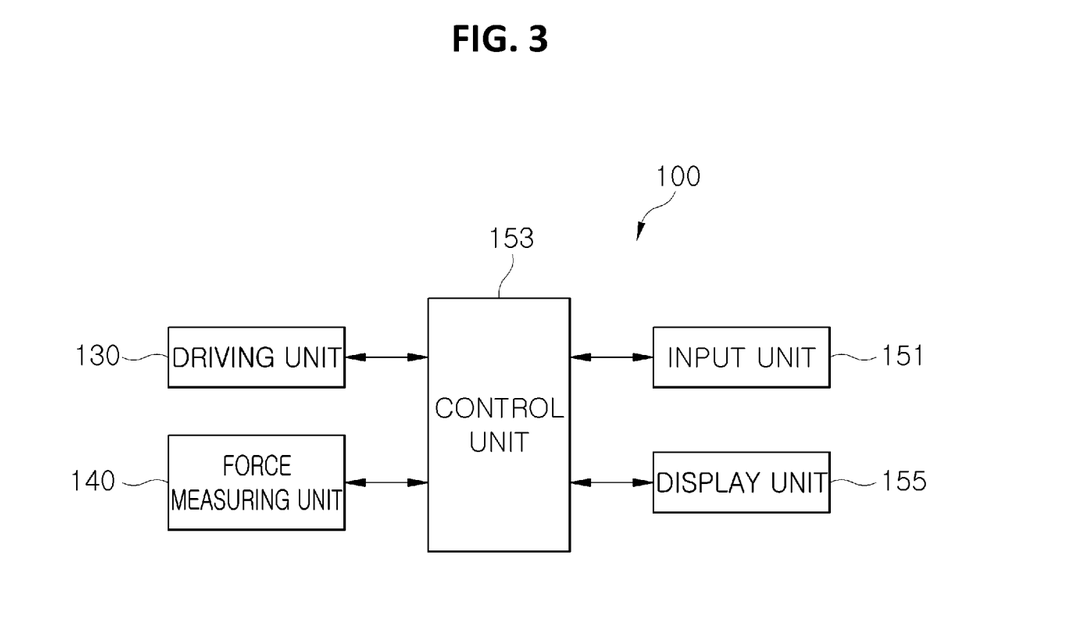
FIG. 3 is a block diagram of a fingerprint generator capable of applying a constant force according to an embodiment.

FIGS. 1 and 2 are exemplary views of a fingerprint generator capable of applying a constant force according to an embodiment, and FIG. 3 is a block diagram of a fingerprint generator capable of applying a constant force according to an embodiment. Referring to FIGS. 1 to 3, a fingerprint generator 100 capable of applying a constant force according to an embodiment may include a base plate 110, a fingerprint mounting unit 120, a driving unit 130, a force measuring unit 140, an input unit 151, a control unit 153, a display unit 155, and a fixing unit 160.

The base plate 110 may be on a horizontal bottom surface, and a target surface 115 may be on an upper surface of the base plate 110. Fingerprints may be generated on the target surface 115 by an impact, and details will be described later below. The target surface 115 may be formed of, for example, paper or floor paper.

Figure 4:
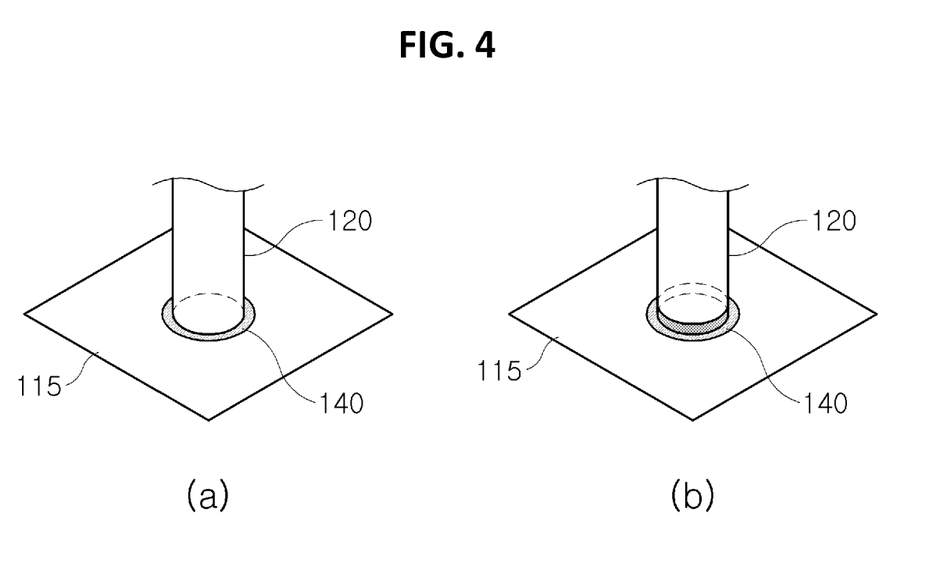
FIG. 4 is an exemplary view of an embodiment of a fingerprint mounting unit of FIG. 2.
Figure 5:
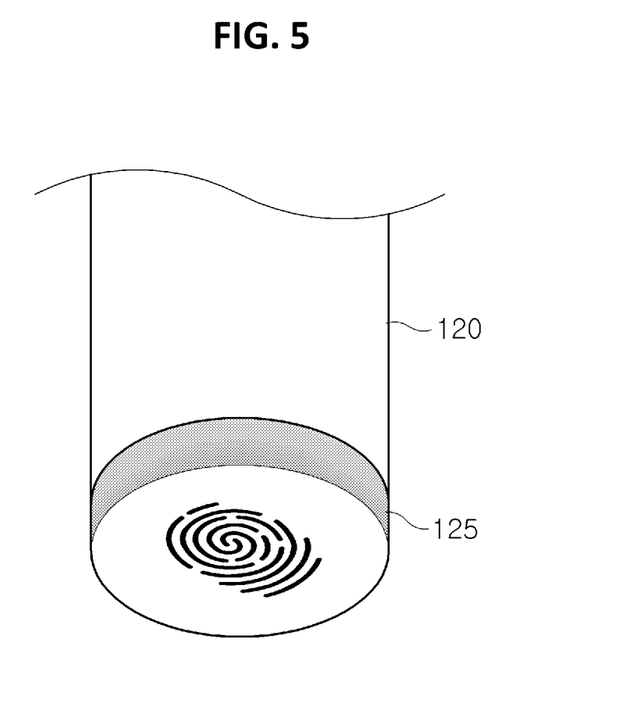
FIG. 5 is a view of FIG. 4 (*b*) viewed from the bottom.

FIG. 4 is an exemplary view of an embodiment of the fingerprint mounting unit 120 of FIG. 2. FIG. 4 (*a*) is an exemplary diagram of a state in which a fingerprint molding body is not mounted on the fingerprint mounting unit 120, and FIG. 4 (*b*) is an exemplary view of a state in which a fingerprint molding body is mounted on the fingerprint mounting unit 120. FIG. 5 is a view of FIG. 4 (*b*) viewed from the bottom.

Referring to FIGS. 4 and 5, the fingerprint mounting unit 120 may be formed to mount a fingerprint molding body 125 on a lower portion of the fingerprint mounting unit 120, and may be connected to the driving unit 130 to move up and down. In this case, the fingerprint mounting unit 120 may be apart from the upper surface of the base plate 110.

The fingerprint mounting unit 120 may mount the fingerprint molding body 125 on the lower portion in various ways.

In an embodiment, by forming a lower end of the fingerprint mounting unit 120 of a metal material, the fingerprint molding body 125 may be directly contacted and fixed to the lower end of the fingerprint mounting unit 120 with double-sided tape or an adhesive.

In another embodiment, an insertion groove is formed in a lower portion of the fingerprint mounting unit 120, and the fingerprint molding body 125 may be directly inserted into the insertion groove to be fixed.

A method of mounting the fingerprint molding body 125 on the lower portion of the fingerprint mounting unit 120 is not limited to the above examples.

As shown in the drawing, the fingerprint mounting unit 120 may be formed in a cylindrical shape, and the fingerprint molding body 125 may be formed in a flat cylindrical shape to be fixed to the lower portion of the fingerprint mounting unit 120. The fingerprint mounting unit 120 and the fingerprint molding body 125 are not limited to any specific shape as long as it is possible to mount and fix the fingerprint molding body 125 on a lower portion of the fingerprint mounting unit 120.

Referring to FIG. 5, the fingerprint molding body 125 has a fingerprint shape formed on the surface of a molding member such as silicon or gelatin. The molding member includes silicone, gelatin, or various impression materials, and is not limited to the above examples as long as the molding member may have a fingerprint shape on its surface. A fingerprint shape formed on a surface of the fingerprint molding body 125 may be brought into contact with the target surface 115 to generate a fingerprint.

For example, the fingerprint molding body 125 may be formed in a manner in which an artificially formed three-dimensional fingerprint shape is patterned on a surface of a molding member such as silicon or gelatin. In more detail, the fingerprint molding body 125 may be formed by thermally transferring a fingerprint shape printed on paper with an etching plate, forming a three-dimensional fingerprint shape on the etching plate through an etching process, and drawing a pattern with a molding member such as silicon or gelatin.

A method of manufacturing the fingerprint molding body 125 is not limited to the above embodiments. The fingerprint molding body 125 may be anything as long as it has a fingerprint shape on its surface and may generate a fingerprint by contact.

The driving unit 130 may move the fingerprint mounting unit 120 up and down. The driving unit 130 is connected to the fingerprint mounting unit 120 and may include a motor, a cylinder, or the like that change the position of the fingerprint mounting unit 120 to move the fingerprint mounting unit 120 up and down. By the driving unit 130, the fingerprint mounting unit 120 having the fingerprint molding body 125 mounted on a lower portion thereof descends from an initial position and rises immediately after contacting the target surface 115, thereby generating an instantaneous impact.

In addition, the driving unit 130 may be apart from the upper surface of the base plate 110. In this case, the driving unit 130 may be installed on the base plate 110 or fixed to the separate fixing unit 160 and installed.

The force measuring unit 140 may measure an impact force when the fingerprint mounting unit 120 descends and makes a fingerprint shape contact with the target surface 115 to generate a fingerprint on the target surface 115.

The fingerprint mounting unit 120 having the fingerprint molding body 125 mounted on the lower portion thereof descends from the initial position by the driving unit 130 and rises immediately after contacting the target surface 115 to generate an impact. At this time, the fingerprint molding body 125 generates a fingerprint on the target surface 115 while bringing the fingerprint shape into contact with the target surface 115 and an impact force is generated. The force measuring unit 140 may measure the impact force at this time.

The force measuring unit 140 may be connected to the base plate 110 or the target surface 115, and is configured to measure the impact force received by the target surface 115 when the fingerprint mounting unit 120 descends. For example, the force measuring unit 140 may be located at a point where the fingerprint molding body 125 mounted on the fingerprint mounting unit 120 and the target surface 115 contact each other.

For example, the force measuring unit 140 may include a load cell. The load cell is a sensor that converts a force into a measurable output signal. When the fingerprint molding body 125 and the target surface 115 are in contact with each other by an impact, the force measuring unit 140 detects an impact force and outputs the impact force as a signal to measure the amount of the impact force.

The input unit 151 is a unit for receiving an input signal for controlling or operating the fingerprint generator 100 capable of applying a constant force according to a user input, and may be implemented as various types of input units. For example, the input unit 151 may include a keyboard, a key pad, a touch pad, a jog wheel, a jog switch, and the like, but is not limited thereto.

The control unit 153 may generally control the operation of the fingerprint generator 100 capable of applying a constant force. The control unit 153 may be implemented in various forms such as a central processing unit (CPU), a processor, a microprocessor, an application processor (AP), a micro controller unit (MCU), a microcomputer, or a mini computer.

The control unit 153 may operate the driving unit 130 based on user input information input to the input unit 151, and may control the fingerprint mounting unit 120 on which the fingerprint molding body 125 is mounted to descend and generate a fingerprint on the target surface 115.

The display unit 155 may display all operating states of the fingerprint generator 100 capable of applying a constant force. In this case, the display unit 155 may display user input information capable of operating the driving unit 130 with a constant force or operation information of the driving unit 130. The user input information may include a force applied to the target surface 115 or the number of times the driving unit 130 is operated.

The fingerprint generator 100 capable of applying a constant force according to an embodiment may form the input unit 151, the control unit 153, and the display unit 155 into one control panel 150.

The control panel 150 may cause the control unit 153 to operate the driving unit 130 according to an input signal from the input unit 151 while performing a function of the input unit 151 receiving a user's touch input signal. In addition, the control panel 150 may simultaneously perform a function of the display unit 155 for displaying an operating state, including user input information for operating the driving unit 130 with a constant force or operation information of the driving unit 130.

In addition, the fingerprint generator 100 capable of applying a constant force according to an embodiment may further include the fixing unit 160.

The fixing unit 160 may fix the fingerprint mounting unit 120 and the driving unit 130 at a position apart from the upper surface of the base plate 110. The fixing unit 160 may be directly connected to the base plate 110, or may not be directly connected to the base plate 110.

In addition, the fingerprint generator 100 capable of applying a constant force according to an embodiment may further include a housing 170.

The housing 170 may accommodate the driving unit 130 including a motor, a cylinder, or the like for moving the fingerprint mounting unit 120 up and down. In addition, the housing 170 may be fixed by the fixing unit 160. The control panel 150 may be formed on one side of the housing 170.

Figure 6:
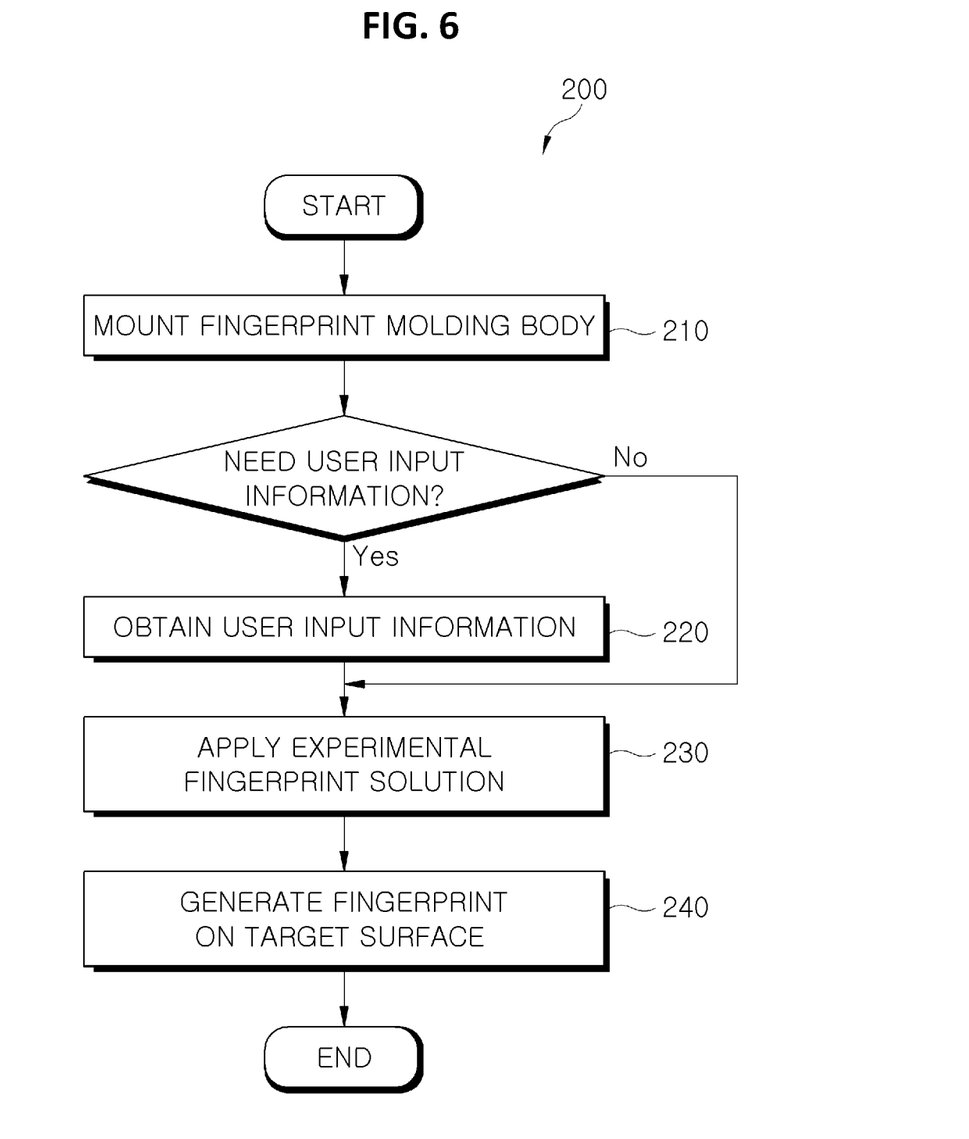
FIGS. 6 and 7 are flowcharts illustrating a fingerprint generation method using a fingerprint generator capable of applying a constant force according to an embodiment.
Figure 7:
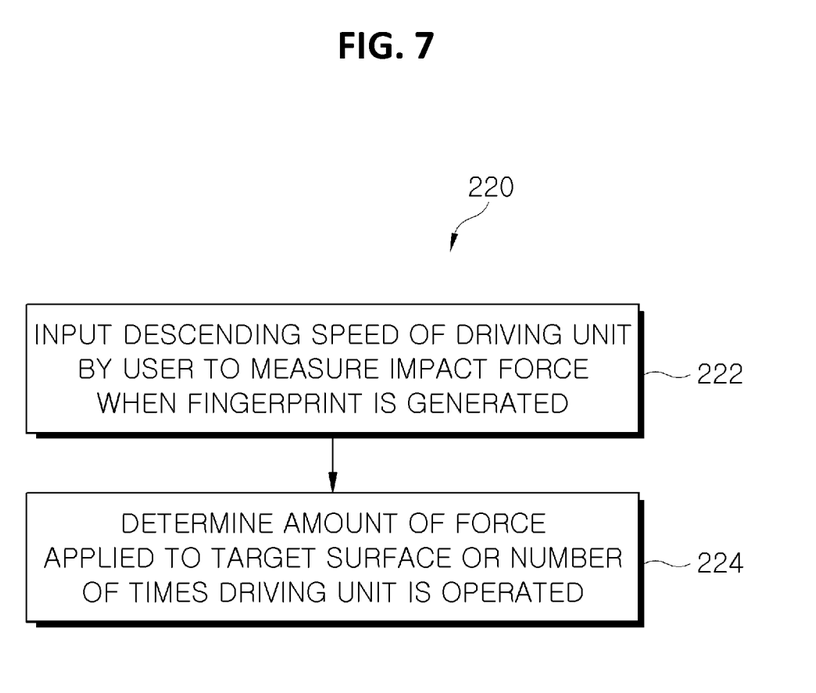

FIGS. 6 and 7 are flowcharts illustrating a fingerprint generation method using a fingerprint generator capable of applying a constant force according to an embodiment.

A fingerprint generation method 200 using a fingerprint generator capable of applying a constant force according to an embodiment will be described with reference to FIGS. 6 and 7.

The fingerprint generator 100 capable of applying a constant force according to an embodiment may include the base plate 110, the fingerprint mounting unit 120, the driving unit 130, and the force measuring unit 140, and may further include the input unit 151, the control unit 153, and the display unit 155.

Operation 210 is mounting the fingerprint molding body 125 having a fingerprint shape on the lower portion of the fingerprint mounting unit 120 of the fingerprint generator 100 capable of applying a constant force according to an embodiment.

When it is not necessary to obtain user input information after operation 210, the following operations 230 and 240 may be performed. When it is necessary to obtain user input information after operation 210, operations 230 and 240 may be performed after operation 220 of obtaining user input information is performed.

Operation 220 is obtaining user input information. Operation 220 of obtaining user input information may include operations 222 and 224.

The user input information is information capable of operating the driving unit 130 with a constant force, and may include the amount of force applied to the target surface 115 or the number of times the driving unit 130 is operated.

In operation 222, the force measuring unit 140 may measure an impact force when a user inputs the descending speed of the driving unit 130 and generates a fingerprint on the target surface 115. The user may input the descending speed of the driving unit 130 to the input unit 151 while changing the descending speed, and according to the descending speed of the driving unit 130, a difference occurs in the impact force measured when fingerprints are generated on the target surface 115. In this way, fingerprints according to an impact force measured when fingerprints are generated are different in shape. Therefore, the user may compare and determine fingerprint shapes respectively generated according to a difference in the descending speed of the driving unit 130 and a difference in the impact force measured by the force measuring unit 140 when fingerprints are generated on the target surface 115.

In operation 224, the user determines the amount of force applied to the target surface 115 or the number of times the driving unit 130 is operated, based on the measured impact force.

The user may determine the range of the amount of force applied to the target surface 115 based on the measured impact force. At this time, the number of times the driving unit 130 is operated according to the amount of force applied to the target surface 115 may also be determined.

In operation 220, the user may find an operating condition of the driving unit 130 when a fingerprint is generated on the target surface 115. The user may comprehensively consider the shape of the fingerprint generated on the target surface 115 according to the various descending speeds of the driving unit 130, and may determine the amount of force applied to the target surface 115 or the number of times the driving unit 130 is operated.

In operation 230, an experimental fingerprint solution (not shown) is applied to the fingerprint molding body 125 having a fingerprint shape formed thereon.

At this time, by using an artificial fingerprint solution including a component similar to human body fluid as the experimental fingerprint solution, a latent fingerprint that is not directly exposed to the naked eye may be formed. On the other hand, by using colored substances such as ink, blood, paint, etc. as the experimental fingerprint solution, a fingerprint that can be seen with the naked eye may be formed. As described above, according to needs of a user, an experimental fingerprint solution including various components may be used.

In an embodiment, the experimental fingerprint solution may be directly applied to a fingerprint shape of the fingerprint molding body 125. In another embodiment, the experimental fingerprint solution may be placed on the target surface 115 and the driving unit 130 is operated so that the experimental fingerprint solution may be applied to the fingerprint molding body 125 attached to the fingerprint mounting unit 120. A method of applying the experimental fingerprint solution is not limited by the above embodiments.

In operation 240, the fingerprint mounting unit 120 descends to make a fingerprint shape contact with the target surface 115 on the upper surface of the base plate 110 to generate a fingerprint on the target surface 115.

At this time, based on the obtained user input information, a user may generate a plurality of fingerprints by applying a constant force to the target surface 115. For example, a user may generate a plurality of uniform fingerprints by inputting a constant force and operating the driving unit 130 twice or more.

In addition, the user may generate a fingerprint while changing the amount of force applied to the target surface 115 at regular intervals.

According to the fingerprint generator 100 capable of applying a constant force according to an embodiment and the fingerprint generation method 200 using the same, a fingerprint shape placed on the tip of a person's finger may be reproduced by using the fingerprint molding body 125 in which a fingerprint shape is formed on silicon or gelatin, and a user may generate a fingerprint by applying a constant force to the target surface 115.

In addition, according to an embodiment, not only may fingerprints be generated by repeatedly applying a constant force to the target surface 115, but also various levels of force may be applied in various ways, thereby enhancing the reliability of fingerprint analysis technology.

On the other hand, according to an embodiment, it is possible to simplify an experiment procedure by omitting an approval procedure of the Institutional Review Board (IRB) regarding human body information that occurs when conducting experiments using human fingerprints.

Therefore, according to an embodiment, it is possible to accelerate the speed of development of the technique of developing latent fingerprints, and to expect more effective criminal case resolution.

According to embodiments, a fingerprint shape may be reproduced such that the fingerprint shape is placed on the tip of a person's finger using a fingerprint molding body in which a fingerprint shape is formed on silicon or gelatin, and a fingerprint may be generated by applying a constant force desired by a user to a target surface.

In the embodiments, not only may fingerprints be generated by repeatedly applying a constant force to a target surface, but also various levels of force may be applied in various ways, thereby enhancing the reliability of fingerprint analysis technology and accelerating the speed of development of the technique of developing latent fingerprints.

It should be understood that embodiments described herein should be considered in a descriptive sense only and not for purposes of limitation. Descriptions of features or aspects within each embodiment should typically be considered as available for other similar features or aspects in other embodiments. Therefore, the scope of the disclosure is defined by the appended claims.

What is claimed is:

1. A fingerprint generator capable of applying a constant force, the fingerprint generator comprising:
   a base plate in which a target surface may be on an upper surface of the base plate;
   a fingerprint mounting unit that is apart from the upper surface of the base plate and capable of mounting a fingerprint molding body having a fingerprint shape thereon on a lower portion of the fingerprint mounting unit;

a driving unit that is apart from the upper surface of the base plate and capable of moving the fingerprint mounting unit up and down; and a force measuring unit configured to measure an impact force when the fingerprint mounting unit descends and contacts the fingerprint shape with the target surface to generate a fingerprint on the target surface.

2. The fingerprint generator capable of applying a constant force of claim 1, the fingerprint generator further comprising:

an input unit configured to receive an input signal according to a user input;

a control unit configured to operate the driving unit according to the user input to control the fingerprint mounting unit on which the fingerprint molding body is mounted to descend and generate a fingerprint on the target surface; and a display unit configured to display user input information capable of operating the driving unit with a constant force or operation information of the driving unit.

3. The fingerprint generator capable of applying a constant force of claim 2, wherein the user input information comprises:

the amount of force applied to the target surface or the number of times the driving unit is operated.

4. The fingerprint generator capable of applying a constant force of claim 2, wherein the input unit, the control unit, and the display unit are formed as a single control panel.

5. The fingerprint generator capable of applying a constant force of claim 1, the fingerprint generator further comprising:

a fixing unit capable of fixing the fingerprint mounting unit and the driving unit in a position apart from the upper surface of the base plate.

6. The fingerprint generator capable of applying a constant force of claim 1, wherein the fingerprint molding body has the fingerprint shape formed on the surface of silicon or gelatin.

7. A fingerprint generation method using a fingerprint generator capable of applying a constant force, the fingerprint generation method comprising:

mounting a fingerprint molding body having a fingerprint shape on a lower portion of a fingerprint mounting unit of the fingerprint generator including a base plate, the fingerprint mounting unit, a driving unit, and a force measuring unit;

applying an experimental fingerprint solution to the fingerprint molding body; and generating a fingerprint on the target surface by lowering the fingerprint mounting unit to contact the fingerprint shape with a target surface located on an upper surface of the base plate.

8. The fingerprint generation method using a fingerprint generator capable of applying a constant force of claim 7, wherein the fingerprint generator further comprises:

an input unit, a control unit, and a display unit, and the fingerprint generation method further comprises:

obtaining user input information capable of operating the driving unit with a constant force after the mounting of the fingerprint molding body.

9. The fingerprint generation method using a fingerprint generator capable of applying a constant force of claim 8, wherein the obtaining of the user input information comprises:

measuring an impact force, by the force measuring unit, when a user inputs the descending speed of the driving unit and generates a fingerprint on the target surface; and determining the amount of force applied to the target surface or the number of times the driving unit is operated based on the measured impact force by the user.

10. The fingerprint generation method using a fingerprint generator capable of applying a constant force of claim 9, wherein the generating of a fingerprint on the target surface comprises:

generating a plurality of fingerprints by applying a constant force by a user to the target surface or generating a fingerprint while changing the amount of force applied to the target surface at certain intervals, based on the obtained user input information.

\* \* \* \* \*